United States Patent
Muehlemann et al.

(10) Patent No.: US 9,182,090 B2
(45) Date of Patent: Nov. 10, 2015

(54) SOLAR POWERED LAMP

(71) Applicant: MPOWERD, Inc., New York, NY (US)

(72) Inventors: Michael Muehlemann, Liverpool, NY (US); Jason Alan Snyder, Ridgewood, NJ (US); Karim Khattab, New York, NY (US)

(73) Assignee: MPOWERD, Inc., New York, NY (US)

( * ) Notice: Subject to any disclaimer, the term of this patent is extended or adjusted under 35 U.S.C. 154(b) by 0 days.

(21) Appl. No.: 14/610,246

(22) Filed: Jan. 30, 2015

(65) Prior Publication Data

US 2015/0192260 A1  Jul. 9, 2015

Related U.S. Application Data

(63) Continuation of application No. PCT/US2014/010246, filed on Jan. 3, 2014.

(60) Provisional application No. 61/978,637, filed on Apr. 11, 2014.

(51) Int. Cl.
| | |
|---|---|
| A47G 23/03 | (2006.01) |
| F21V 19/00 | (2006.01) |
| F21L 4/08 | (2006.01) |
| F21V 31/00 | (2006.01) |
| F21S 9/03 | (2006.01) |
| F21V 23/04 | (2006.01) |
| F21Y 103/00 | (2006.01) |
| A47G 19/22 | (2006.01) |
| F21Y 101/02 | (2006.01) |

(52) U.S. Cl.
CPC ............... *F21L 4/08* (2013.01); *A47G 23/0309* (2013.01); *F21S 9/037* (2013.01); *F21V 31/00* (2013.01); *A47G 2019/2238* (2013.01); *F21V 19/003* (2013.01); *F21V 23/0414* (2013.01); *F21V 23/0464* (2013.01); *F21Y 2101/02* (2013.01); *F21Y 2103/003* (2013.01)

(58) Field of Classification Search
CPC .................. A47G 23/0309; A47G 2019/2238; F21Y 2103/003; F21Y 2101/02; F21V 23/04; F21V 23/0414; F21V 23/0428; F21V 33/0024; F21V 31/00; F21V 19/003; F21V 23/0464; F21L 4/02; F21L 4/08; F21S 9/03; F21S 9/035; F21S 9/037
USPC .................................................. 362/101, 183
See application file for complete search history.

(56) References Cited

U.S. PATENT DOCUMENTS

| 2,245,715 | A | * | 6/1941 | Rieck ............................ 362/190 |
| 4,979,339 | A | * | 12/1990 | Jones et al. ......................... 52/3 |

(Continued)

OTHER PUBLICATIONS

T.J.Cumberbatch et al, "Self-Assembled Solar Lighting Systems", Oct. 11, 2009, Proc.ISES Solar World Congress, pp. 1-10.*

(Continued)

*Primary Examiner* — Alan Cariaso
(74) *Attorney, Agent, or Firm* — Pearl Cohen Zedek Latzer Baratz LLP

(57) ABSTRACT

A lighting element for a solar powered lantern is formed integrally with a bottle closure which can be threaded onto a discarded plastic bottle, such that the light emitting diodes (LEDs) of the lighting element extend into the bottle. The lighting element is powered by a rechargeable battery which is recharged by a photovoltaic panel positioned on the top surface of the bottle closure.

17 Claims, 4 Drawing Sheets

(56) References Cited

U.S. PATENT DOCUMENTS

| | | | | |
|---|---|---|---|---|
| 5,427,258 A * | 6/1995 | Krishnakumar et al. | ..... | 215/400 |
| 5,890,794 A * | 4/1999 | Abtahi et al. | ................. | 362/294 |
| 6,200,000 B1 | 3/2001 | Burnidge | | |
| 6,254,247 B1 * | 7/2001 | Carson | ........................ | 362/101 |
| 7,318,656 B1 * | 1/2008 | Merine | ........................ | 362/154 |
| 8,011,816 B1 * | 9/2011 | Janda | ........................ | 362/375 |
| 2003/0169590 A1 | 9/2003 | Sorli et al. | | |
| 2005/0007773 A1 * | 1/2005 | Austin | ........................ | 362/206 |
| 2006/0221595 A1 * | 10/2006 | Payne | ........................ | 362/101 |
| 2007/0147063 A1 | 6/2007 | Collomb et al. | | |
| 2009/0133636 A1 | 5/2009 | Richmond | | |
| 2009/0175029 A1 * | 7/2009 | Chiang | ........................ | 362/101 |
| 2010/0308005 A1 * | 12/2010 | Callanan | ........................ | 215/228 |
| 2012/0134143 A1 | 5/2012 | Lederer et al. | | |
| 2012/0200235 A1 | 8/2012 | Shuy et al. | | |
| 2014/0003037 A1 * | 1/2014 | Kuelzow et al. | ................. | 362/101 |
| 2014/0049942 A1 * | 2/2014 | Chilton et al. | ................. | 362/96 |

OTHER PUBLICATIONS

Lichauco De Leon, "Sunligh-powered 'bulbs' made from plastic bottles light up homes." The Guardian, Dec. 23, 2011, p. 1-2, http://www.theguardian.com/environmentl2011/dec123/sunlight-bulbs-plastic-bottles-light.

International Search Report for International Application No. PCT/US14/10246, mailed Aug. 27, 2014.

* cited by examiner

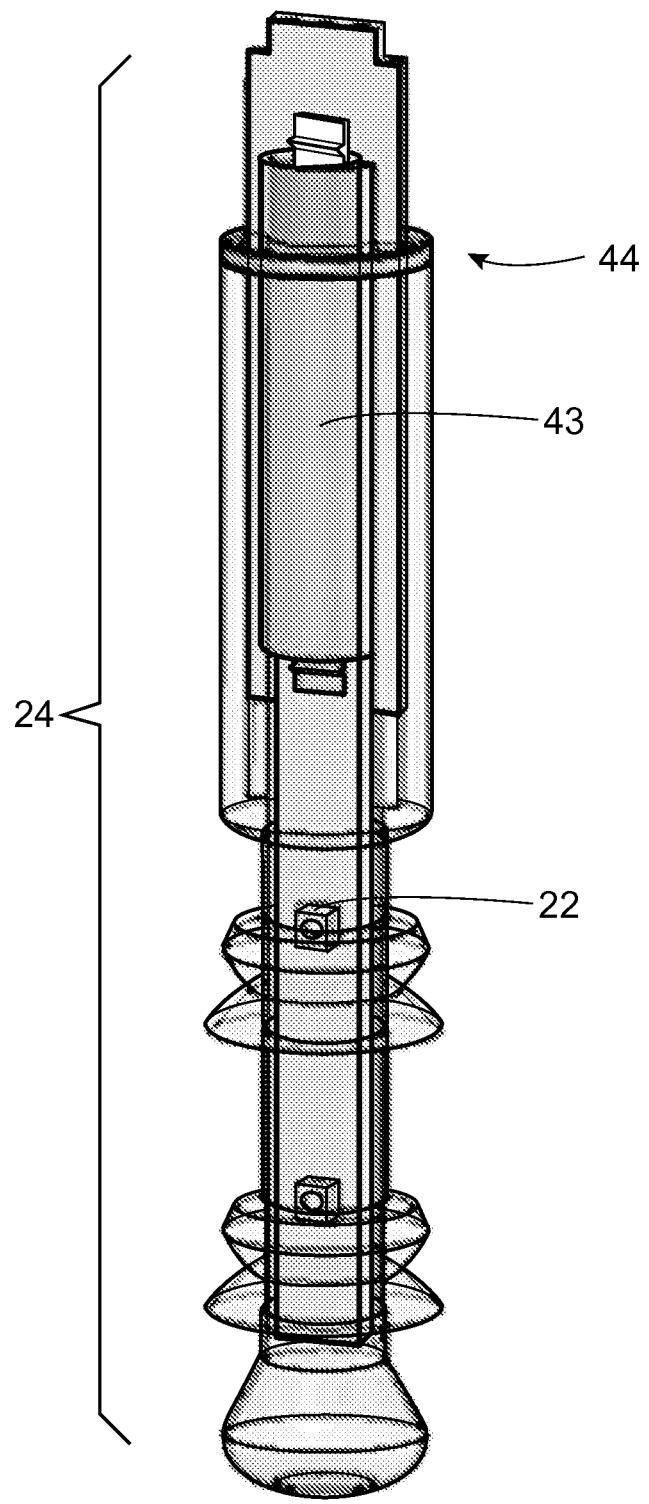

SOLAR POWERED LAMP

CROSS-REFERENCE TO RELATED APPLICATIONS

This application claims the benefit of PCT International Application No. PCT/US14/10246, filed Jan. 3, 2014, and Provisional Patent Application No. 61/978,637, filed Jan. 3, 2013, which are hereby incorporated by reference.

BACKGROUND OF THE INVENTION

1. Field of the Invention

The invention is directed to a solar powered lantern having a lighting element powered by a rechargeable battery. The lighting element is formed integrally with a bottle closure which can be threaded onto a discarded plastic bottle, such that the light emitting diodes (LEDs) of the lighting element extend into the bottle. A photovoltaic panel on the closure recharges the battery during sunlight hours.

The invention may be used to provide access to affordable light in the developing world, and in the developed world may serve an aesthetic and/or promotional purpose.

2. Description of the Related Art

More than 1.5 billion people in the developing world live off the grid without access to a reliable source of light after sunset. In many areas, kerosene lamps are the primary lighting source at a cost of approximately $2.50 per month. These lamps have low output and can cause fire hazards and health problems. Thus, it would be a desirable advance if "light poverty" could be addressed at a competitive price point with a sustainable and renewable light source.

SUMMARY OF THE INVENTION

These and other objects of the invention are achieved according to the invention, in one aspect, with a solar powered lantern, comprising: a translucent plastic base having a closed bottom end, a top end, and a threaded opening at the top end. In preferred embodiments, the plastic base is a discarded plastic bottle such as a standard polyethylene terephthalate beverage container, which may be clear or colored. A threaded closure is provided mating with the threaded opening at the top end of the base, having a flat top surface and a photovoltaic panel arranged on the top surface. A rechargeable battery is arranged on a side of the closure opposite the photovoltaic panel and is connected to the photovoltaic panel. An elongated lighting element connected to the rechargeable battery is arranged on a side of the closure opposite the photovoltaic panel and comprises an array of light emitting diodes (LEDs) extending away from the top surface of the closure into the base.

In another aspect, the lighting element is provided separately, and the user may adapt the lighting element in a discarded container to form a lantern.

BRIEF DESCRIPTION OF THE DRAWINGS

FIG. 4 depicts the lower portion of the lighting element of FIG. 2, comprising a tube with an elongated array of LEDs.

DETAILED DESCRIPTION OF THE INVENTION

A solar powered lantern according to the invention includes a photovoltaic panel and a battery integrated into a cap or closure which fits onto a standard threaded opening of a plastic bottle, such as a conventional polyethylene terephthalate (PET) bottle.

Figure 1:
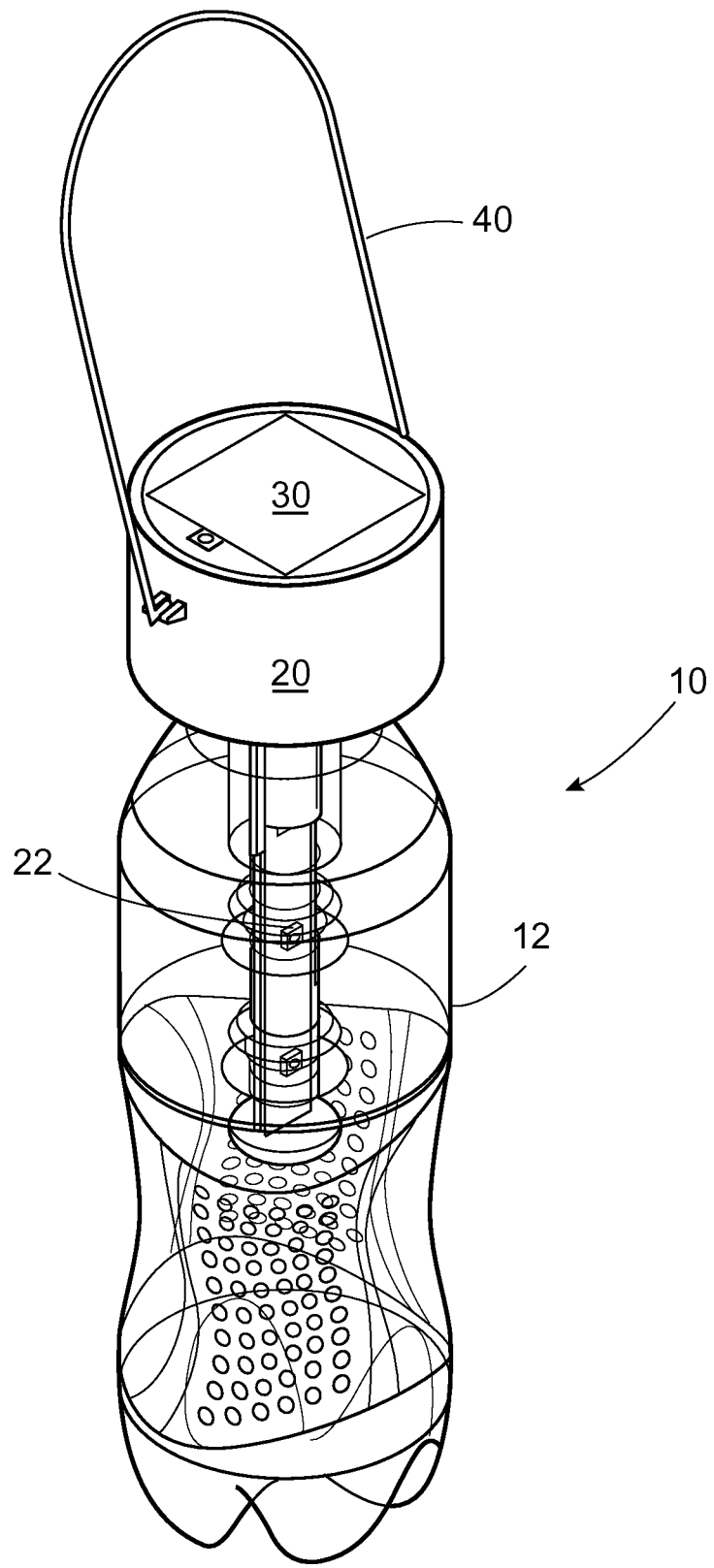
FIG. 1 is a perspective view of a solar lantern according to an embodiment of the invention.
Figure 2:
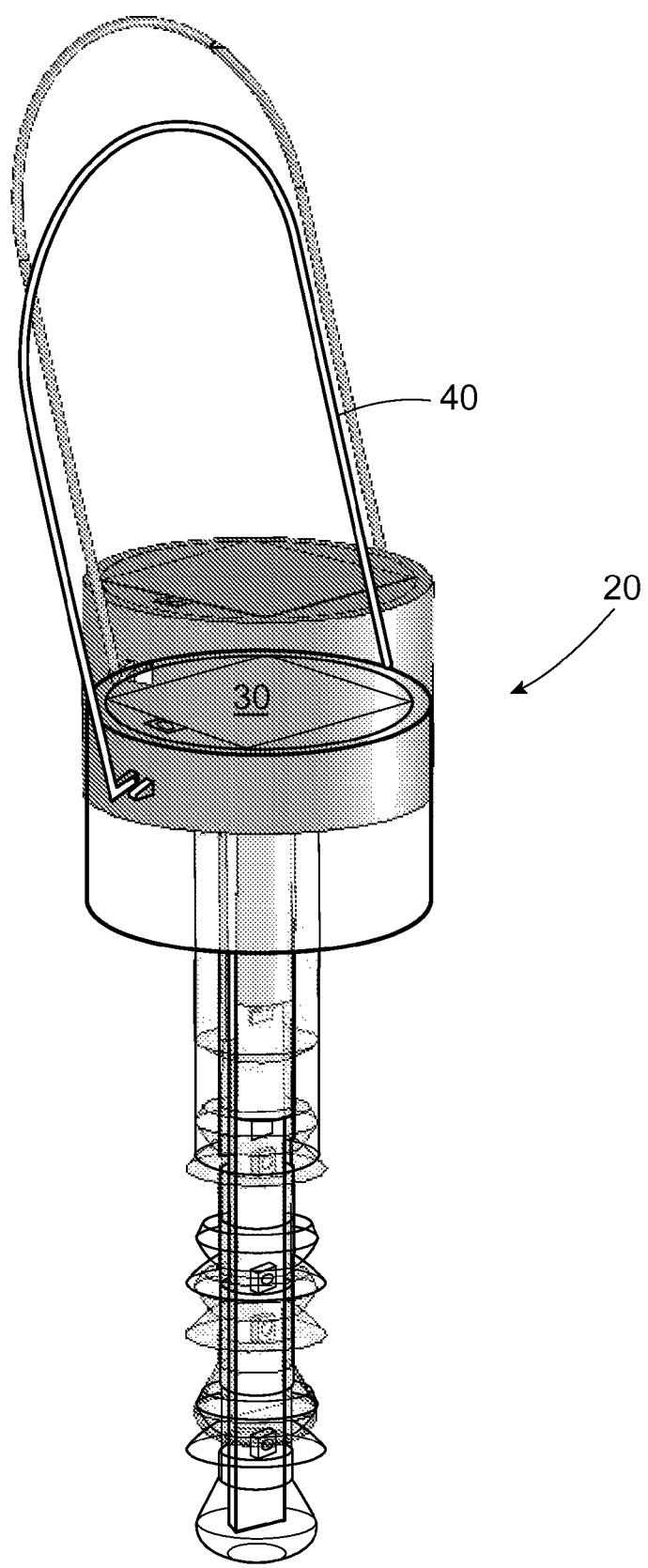
FIG. 2 depicts a lighting element according to an embodiment of the invention.

In the embodiment shown in FIG. 1, the lighting element 20 comprises a photovoltaic panel 30 on the top surface of the cap. The cap may be approximately 55 mm in diameter, calculated to provide sufficient area so that the photovoltaic panel can generate sufficient current to recharge the battery for a predetermined number of hours of operation at the desired light level, as described below. The lighting element 20 screws onto the bottle 12 using the same thread pattern as the original cap (in the case of a discarded and recycled base container), creating a water tight seal. This allows the bottle 12 to be filled with water to create a weighted base for the lantern. Alternatively, sand or other solid material may be added to the container to provide a weighted base. Additional reflective materials may be provided in the container to increase the diffusivity of the light.

Figure 3:
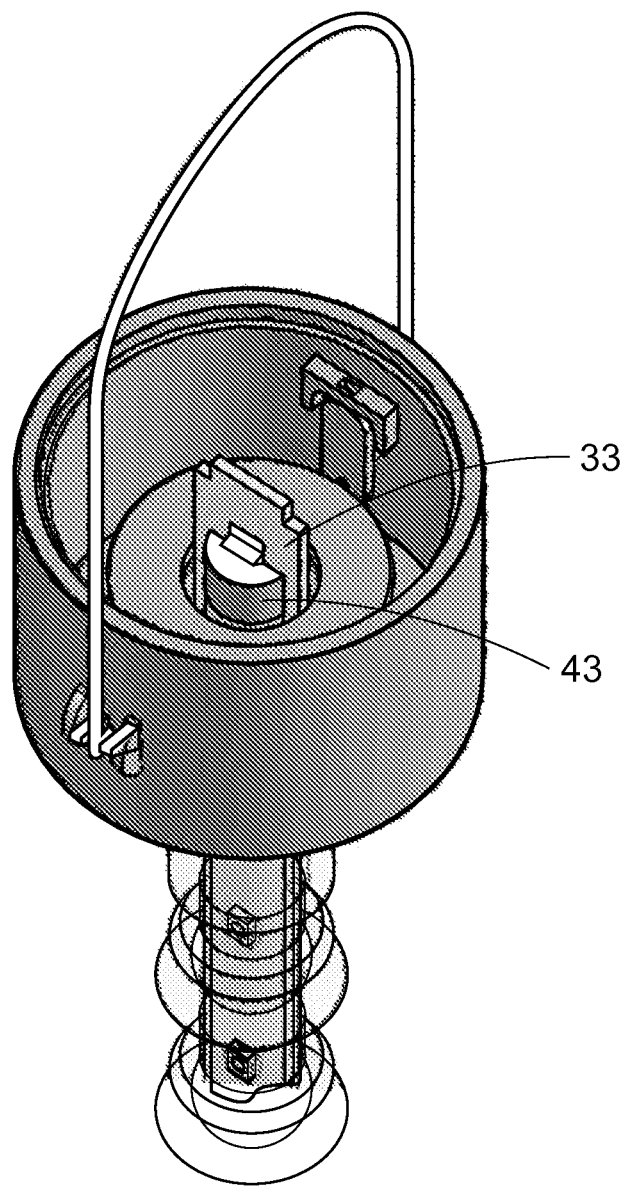
FIG. 3 depicts the interior of the top portion of the lighting element of FIG. 2.

The lighting element 20 comprises a rechargeable battery which powers an array of light emitting diodes (LEDs) extending into the container 12. In the embodiment shown, four LEDs 22 are provided, however the number of LEDs in the array may be left to the skill of the artisan to decide. A "U-shaped" wire handle 40 acts as both a carrying handle and ON/OFF switch. As shown in FIG. 3, a printed circuit board (PCB) 33 provides the circuitry to power the array of LEDs at different power levels and to power different LEDs in the array. Small embossed tabs on the cap allow the handle/switch 40 to click into three positions. In a first position on one side, the lantern is off, while in the second position (vertical, for example) the lantern is FULL ON (all four LEDs lighted at full intensity). When the handle is at a third position, opposite the first position, the two LEDs opposite the handle are ON, creating a project specific task light that has the same irradiance as the FULL ON mode, but with twice the battery lifetime. The battery operation time at FULL ON mode with a full battery charge is preferably greater than 1 hour, more preferably greater than 2 hours and still more preferably 4 hours or greater.

The selection of the brightness of the LED array is also left to the skill of the artisan, and is preferably greater than 10 lumens, and more preferably 20 lumens or greater. To meet the majority of international standards (Lighting Africa, United Nations UNDESA, Nigeria SONCAP, etc.) it may be preferable to achieve a minimum of 20 lumens in the FULL ON condition. Using this design point, an exemplary but non-limiting specification for the battery capacity and the solar panel capacity are set forth in Tabled 1-3. This example is based on the production of 20 lumens using four (4) LEDs, with a target operability of 4 hours per day. This results in a design which requires approximately 1 watt-hour of energy to be collected (by the solar panel) and stored (in the battery) as set forth in Tables 1-3 below.

TABLE 1

Lighting Element Design

| | |
|---|---|
| #of LEDs | 4 |
| Correlated Color Temperature | 6500 °K |
| LED Current | 20 mA |
| Total Current (FULL Power) | 80 mA |
| LED $V_{forward}$ | 3.1 V |

TABLE 1-continued

Lighting Element Design

| | | |
|---|---|---|
| Total Wattage | 0.248 | W |
| Lumens/Watt | 82 | lm/W |
| Total Lumen Output (Lantern Mode) | 20.336 | lm |
| Total Lumen Output (Task Light Mode) | 10.168 | lm |
| Desired Hours @ Full Intensity | 4 | hours |
| Energy Required (Watt-hrs) | 0.992 | W-hr |

The photovoltaic panel is then designed to collect this amount of energy as follows:

TABLE 2

PV Solar Panel

| | | |
|---|---|---|
| Power Density | 0.115 | mW/mm$^2$ |
| Voltage per Cell | 0.5 | V |
| Number of Cells Required | 8 | |
| Voc | 4 | V |
| Vop (85% of Voc) | 3.4 | V |
| Number of Charge Hours | 6.7 | hrs |
| Total Watt-hr Density | 0.00077 | W-hr/mm$^2$ |
| PV Surface Area Required | 1287.5 | mm$^2$ |
| Linear Length (Square) | 35.9 | mm$^2$ |
| Diagonal Length | 50.7 | mm$^2$ |
| Array Configuration (8 cells): | 2 × 4 | Array |
| Individual Cell Size (×8 pieces): | 18 × 9 | mm |
| Total Array Power | 148.1 | mW |

In order to generate this amount of energy, using standard polycrystalline photovoltaic cells the photovoltaic panel must have almost 1300 mm$^2$ of surface area, yielding a 36×36 mm square collection area, or diagonal dimension of 51 mm. In the selected design, the diameter of the cap is 55 mm. This solar panel may be made of eight (8) photovoltaic chips arranged in a 2×4 array, each photovoltaic chip being 9×18 mm in size, to provide ease of handling and limit breakage.

This collected solar energy is then stored in a rechargeable, replaceable battery rated at 2000 charging cycles, such as an N-type LiFePO$_4$ battery with 350 mA-hr capacity. This battery can be fully charged by the solar panel in under 8 hours, and will provide more than the desired 4 hours of use at full intensity in the lantern mode. In the task lighting mode the battery will provide about 9 hours of light.

TABLE 3

Storage Reservoir

| | | |
|---|---|---|
| Battery Type: | LiFePO$_4$ | N-size, φ11.5 × 49 mm |
| Battery Current Capacity: | 350 | mA-hr |
| Nominal Voltage: | 3.2 | V |
| Battery Power Capacity: | 1.1 | W-hr |
| Light Lifetime (Full Power) | 4.5 | hr |
| Light Lifetime (Half Power) | 9.0 | Hr |
| Charge Time Required | 7.6 | Hr |

The cap may be made of an injection molded plastic (such as acrylonitrile butadiene styrene (ABS) or equivalent) that provides the structure for the solar panel, the handle, the bottle threads, the lamp/battery assembly, and a tube containing the LED array. As shown in FIG. 3 and FIG. 4, on one end of the handle the switch assembly is attached to the underside of the solar panel PCB. The lap/battery assembly sits in a slot within solar panel PCB and is soldered in place to form the electrical connections.

The standard 3-position switch is mounted on the bottom side of the photovoltaic panel. Two small injection molded parts (ABS or equivalent) form the switch mechanism. The first is the "saddle" which is fitted over the switch. The "lever" attaches to the wire handle and allows the switch to be turned to the first side, vertical and second side positions. A rectangular shape on the end of the wire keeps the lever from slipping.

The PCB may include a switch, a current limiting resistor for the LEDs, a dark current diode to prevent the panel from discharging the battery, and a simple battery charger chip to protect the battery. While other electronics may be employed, this minimal configuration provides for a low manufacturing cost.

As shown in FIG. 4 optical tube 24 houses the LED array 22 and battery 43. The tube 24 is provided a waterproof seal for these elements using a small o-ring 44 at the top of the tube. This also provides the mechanical element that holds the tube in place inside the cap. Thus, the tube may be removed from the cap for replacement of the battery. When a new battery is inserted, the tube may be plugged back into the cap and snapped into place.

The optical tube is an injection molded part (clear ABS or equivalent) that provides refractive and reflective elements near the LEDs. These elements are designed to capture the light emitted from each LED and redirect the light downwards to create a uniform disk of light about 1 meter in diameter (when in the lantern mode).

The LED array and battery are assembled with a basic fiberglass PCB 33 with a rectangular shape cut in the middle to house the battery. The LEDs are mounted on both sides of the board. The card edge style terminations on the end of the PCB 33 are right angle soldered directly to the photovoltaic panel and provide the connections for the battery and for the LEDs.

In embodiments, the lantern may be provided with a power management circuit to correspond with a daytime/nighttime usage scheme. A cycle consists of 2 phases. The cycle starts during the morning time which is the charging phase. Followed by the nighttime/lighting phase during which the stored energy is utilized. When the sun comes up, sunlight falling on the photovoltaic panel is converted to electric energy in the form of a direct current. The direct current generated charges the battery with the aid of the power management circuit. The battery stores the electric energy for later use when the sun goes down or when the ambient light intensity drops below 5-15 Lux. A light sensor may be provided to detect light intensity for this purpose. During the morning time the light intensity switch will ensure that the circuit connecting the battery to the LEDs is open. This will prevent the battery from being drained by the LEDs to save all the energy produced for use when it is needed. When the sun goes down the ambient light intensity will drop. Once the photovoltaic panel is no longer producing significant electric energy, the light intensity sensor will turn Off the charging circuit and turn ON the LEDs' circuit, which functionality may also be complemented with a switch operation.

The battery, power management circuit, LED array, photovoltaic panel and light sensor may be wired together to form two circuits that share the same battery, power management circuit and light sensor. The first circuit connects the photovoltaic panel to the battery through the power management circuit and the light sensor. The second circuit connects the battery, light sensor and the LED array. The light sensor ensures that only one of the two circuits is closed depending on the ambient light flux. Using this daytime/nighttime usage scheme, the lantern could effectively be positioned The foregoing description of the preferred embodiments is not to be deemed limiting of the invention, which is defined in the appended claims. Sufficient information is provided in the foregoing that the skilled artisan may practice variants of the embodiments described without departing from the scope of the invention. Features described in connection with one embodiment, and dependent claims described in connection with one independent claim maybe combined with each other, with other embodiments, and with other independent claims without departing from the scope of the invention.

The invention claimed is:

1. A solar powered lantern, comprising:
    a translucent plastic base having a closed, bottom end, a top end, and a threaded opening at the top end;
    a threaded closure mating with the threaded opening at the top end and having a flat top surface and a photovoltaic panel arranged on the top surface;
    a rechargeable battery arranged on a side of the closure opposite the photovoltaic panel and connected to the photovoltaic panel; and
    an elongated lighting element connected to the rechargeable battery arranged on a side of the closure opposite the photovoltaic panel and comprising an array of light emitting diodes (LEDs) extending away from the top surface of the closure into the base,
    wherein the elongated lighting element includes an LED array mounted on opposite sides of a printed circuit board, housed within an optical tube sealed to the cap, and
    wherein the rechargeable battery is received in a cut-out in the printed circuit board.

2. The solar powered lantern according to claim 1, wherein the base is a discarded standard plastic beverage container.

3. The solar powered lantern according to claim 1, wherein the base is a discarded polyethylene terephthalate bottle.

4. The solar powered lantern according to claim 1, comprising a U-shaped wire handle attached to the closure at opposite ends of the handle, said handle connected to a switch in the closure such that pivoting the handle powers the LEDs on and off.

5. The solar powered lantern according to claim 4, wherein the switch has at least three positions, each corresponding to a position of the wire handle, and each position corresponding to different power levels of the LEDs.

6. The solar powered lantern according to claim 4, further comprising:
    a light sensor, and
    a power management circuit operatively connected to the light sensor, the rechargeable battery and the photovoltaic panel, wherein
    the power management circuit is adapted to direct current from the photovoltaic panel to the battery when sunlight is incident on the photovoltaic panel, and to direct current to the array of light emitting diodes when the switch is turned to an ON position.

7. The solar powered lantern according to claim 1, wherein the array of light emitting diodes produces at least 10 lumens of light in a full ON condition.

8. The solar powered lantern according to claim 1, wherein the rechargeable battery has a life of about four hours at the full ON condition.

9. The solar powered lantern according to claim 1, wherein the array of light emitting diodes is water resistant, and further comprising a liquid provided in the base.

10. A lighting element for a solar powered lantern, comprising:
    a threaded closure adapted to mate with a standard size beverage container and having a flat top surface and a photovoltaic panel arranged on the top surface;
    a rechargeable battery; and
    an elongated lighting element to comprising a printed circuit board having a cutout receiving the rechargeable battery, arranged on a side of the closure opposite the photovoltaic panel, and
    an array of light emitting diodes (LEDs) mounted on opposite sides of the printed circuit board and extending away from the top surface of the closure within an optical tube.

11. A method of making a solar powered lantern, comprising the step of inserting the lighting element of claim 10 into a discarded standard plastic container.

12. The method according to claim 11, further comprising the step of putting liquid in the container prior to inserting the lighting element into the container.

13. The method according to claim 11, wherein the plastic container is a clear one-liter polyethylene terephthalate bottle.

14. The method according to claim 11, wherein the plastic container is provided with branding indicia.

15. The method according to claim 11, wherein the plastic container is a new standard plastic container.

16. The method according to claim 11, wherein there is no liquid in the container.

17. The method according to claim 11, wherein there is sand or other solid material in the container.

* * * * *